United States Patent
Li et al.

(10) Patent No.: US 9,143,992 B2
(45) Date of Patent: Sep. 22, 2015

(54) HANDOVER METHOD OF TERMINAL, AND BASE STATION THEREOF

(75) Inventors: Bin Li, Shenzhen (CN); Na Liang, Shenzhen (CN)

(73) Assignee: ZTE CORPORATION, Shenzhen, Guangdong Province (CN)

(*) Notice: Subject to any disclaimer, the term of this patent is extended or adjusted under 35 U.S.C. 154(b) by 740 days.

(21) Appl. No.: 13/390,778

(22) PCT Filed: Mar. 30, 2010

(86) PCT No.: PCT/CN2010/071419
§ 371 (c)(1),
(2), (4) Date: Feb. 16, 2012

(87) PCT Pub. No.: WO2011/020325
PCT Pub. Date: Feb. 24, 2011

(65) Prior Publication Data
US 2012/0149378 A1 Jun. 14, 2012

(30) Foreign Application Priority Data
Aug. 21, 2009 (CN) .......................... 2009 1 0171301

(51) Int. Cl.
H04W 36/00 (2009.01)
H04W 4/00 (2009.01)
H04W 28/08 (2009.01)

(52) U.S. Cl.
CPC .......... *H04W 36/0055* (2013.01); *H04W 28/08* (2013.01)

(58) Field of Classification Search
CPC .............................. H04W 36/30; H04W 80/64
USPC ................................... 455/438, 436; 370/331
See application file for complete search history.

(56) References Cited

U.S. PATENT DOCUMENTS

| 2004/0121777 | A1* | 6/2004 | Schwarz et al. ........... 455/452.1 |
| 2009/0131056 | A1* | 5/2009 | Bontu et al. .................. 455/436 |
| 2009/0137251 | A1* | 5/2009 | Ji et al. ......................... 455/437 |
| 2010/0027507 | A1* | 2/2010 | Li et al. ........................ 370/331 |

FOREIGN PATENT DOCUMENTS

| CN | 101001439 A | 7/2007 |
| CN | 101360343 A | 2/2009 |

(Continued)

OTHER PUBLICATIONS

International Search Report for PCT/CN2010/071419 dated Jun. 20, 2010.

*Primary Examiner* — Muthuswamy Manoharan
(74) *Attorney, Agent, or Firm* — Ling Wu; Stephen Yang; Ling and Yang Intellectual Property

(57) ABSTRACT

A handover method of a target base station is disclosed in the present invention, including: after a source base station to which a terminal belongs transmitting a handover request message to at least one alternate target base station, every alternate target base station notifying the source base station of a load state Parameter, and the source base station determining one target base station according to the load state parameter of every alternate target base station and indicating the terminal to perform handover to the target base station. A base station is also provided in the present invention, including: a handover request transmission module, a handover request response reception module, a target base station determination module and a handover request response transmission module. The present invention avoids the re-request process of the base station when the handover request fails, and can improve the handover success ratio.

4 Claims, 2 Drawing Sheets

(56) References Cited

FOREIGN PATENT DOCUMENTS

| | | |
|---|---|---|
| CN | 101521920 A | 9/2009 |
| CN | 101521921 A | 9/2009 |
| CN | 101646212 A | 2/2010 |
| JP | 2002232929 A | 8/2002 |
| JP | 2006303739 A | 11/2006 |
| JP | 2008160463 A | 7/2008 |

* cited by examiner

HANDOVER METHOD OF TERMINAL, AND BASE STATION THEREOF

TECHNICAL FIELD

The present invention relates to a wireless communication system, and in particular, to a handover method of a terminal and a base station in the long term evolution (LTE) system.

BACKGROUND OF THE RELATED ART

As shown in FIG. 1, in the third generation mobile communication long term evolution system, a handover method based on the X2 interface of the base station comprises: when the terminal is required to perform handover between the base stations, the source base station to which the terminal belongs selecting a target base station according to a measurement result which is performed by the terminal to the adjacent base stations, and transmitting a handover request message (the message includes information, such as, a source base station identifier, a base station handover type, source cell information and a handover terminal identifier, etc.) to the target base station to request the resource; and the target base station performing the handover admission evolution, allocating the relevant resource (including the access parameter of the handover terminal in the target cell, etc.) for the terminal performing handover to the target base station, and returning a handover request response message to the source base station.

As shown in FIG. 2, in the third generation mobile communication long term evolution system, a handover method based on the S1 interface of the base station comprises: when the terminal is required to perform handover between the base stations, the source base station to which the terminal belongs selecting a target base station according to a measurement result which is performed by the terminal to the adjacent base stations, and the source base station applying for the resource from a single target base station through a mobility management entity (MME), that is, the source base station transmitting the handover request message (the message includes information, such as, a source base station identifier, a base station handover type, source cell information and handover terminal identifier, etc.) to the MME, and then the MME forwarding the handover request message to the target base station; and the target base station performing the handover admission evolution, allocating the relevant resource (including the access parameter of the handover terminal in the target cell, etc.) for the terminal performing handover to the target base station, and returning a handover request response message to the MME, and the MME forwarding the handover request response message to the source base station in the direction of the handover command.

In the above methods that are known in the art, if the evolution result of the target base station is that the handover is unable to be performed, the source base station is required to re-select the target base station and re-transmit the handover request message, which slows the handover of the terminal, increases the handover delay, reduces the handover efficiency, and reduces the key performance indicators (KPI) during the handover.

SUMMARY OF THE INVENTION

The technical problem to be solved in the present invention is to provide a handover method of a terminal and a base station, which improves the handover success ratio and reduces the handover interruption delay.

In order to solve the above problem, the present invention provides a handover method of a target base station, comprising: after a source base station to which a terminal belongs transmitting a handover request message to at least one alternate target base station, every alternate target base station notifying the source base station of a load state parameter, and the source base station determining one target base station according to the load state parameters of various alternate target base station and indicating the terminal to perform handover to the target base station.

The above method can be further characterized in that:
before the alternate target base station notifying the source base station of the load state parameter, the method further comprises:
the alternate target base station calculating an own load state parameter, and
when determining that the load state parameter is larger than a load state threshold set by a system, returning a handover request response message including the load state parameter to the source base station directly or to the source base station through a mobility management entity to notify the source base station;
when determining that the load state parameter is smaller than or equal to the load state threshold set by the system, returning the handover request response message including the load state parameter and wireless resource configuration information required in terminal handover to the source base station directly or to the source base station through the mobility management entity to notify the source base station.

The above, method can be further characterized in that:
after transmitting the handover request message, the source base station starts a timer module,
after receiving the handover request response message in a timing period of the timer module, the step of determining the target base station comprises: when determining that the load state parameter is smaller than or equal to the load state threshold set by the system, determining the alternate target base station transmitting the handover request response message as the target base station,
the indicating step comprises: indicating the terminal to perform handover to target base station according to the wireless resource configuration information.

The above method can be further characterized in that:
after transmitting the handover request message, the source base station starts a timer module,
after receiving the handover request response message in a timing period of the timer module, the step of determining the target base station comprises: when the load state parameters are all larger than the load state threshold set by the system, the source base station determining an alternate target base station corresponding to a minimal load state parameter in various load state parameters as the target base station,
the indicating step comprises: the source base station obtaining the wireless resource configuration information required in the terminal handover from the target base station, and indicating the terminal to perform handover to the target base station according to the wireless resource configuration information.

The above method can be further characterized in that:
the load state parameter is one of following values: a value of a load quantity of the alternate target base station, a percentage value of the load quantity of the alternate target base station to a fixed load quantity set by the system, and a level of the load quantity of the alternate target base station.

The above method can be further characterized in that:
the load state parameter is a level of a load quantity of the alternate target base station, the levels corresponding to the load quantity from small to large are level 1, level 2, level 3 and level 4 in sequence, and the load state threshold set by the system is a level threshold larger than level 2 and smaller than level 3.

In order to solve the above problem, the present invention provides a base station, comprising: a handover request transmission module, a handover request response reception module, a target base station determination module and a handover request response transmission module; wherein, when the base station acts as a source base station to which a terminal belongs, the handover request transmission nodule is configured to: transmit a handover request message to at least one alternate target base station;

when the base station acts as the source base station to which the terminal belongs, the handover request response reception module is configured to: receive a handover request response message returned by the alternate target base station and analyze to obtain a load state parameter included in the handover request response message;

when the base station acts as the source base station to which the terminal belongs, the target base station determination module is configured to: determine one target base station according to the load state parameters of various alternate target base stations analyzed by the handover request response reception module, and indicate the terminal to perform handover to the target base station;

when the base station acts as the alternate target base station of the terminal, the handover request response transmission module is configured to: receive the handover request message, and then return the handover request response message including the load state parameter to the source base station.

The above base station can be further characterized in that:

when the base station acts as the alternate target base station of the terminal, the handover request response transmission module is further configured to: calculate the load state parameter of the alternate target base station after receiving the handover request message transmitted by the source base station, and when determining that the load state parameter is larger than a load state threshold set by a system, return the handover request response message including the load state parameter to the source base station directly or to the source base station through a mobility management entity;

when determining that the load state parameter is smaller than or equal to the load state threshold set by the system, return the handover request response message including the load state parameter and wireless resource configuration information required in terminal handover to the source base station directly or to the source base station through the mobility management entity.

The above method can be further characterized in that:

the base station further comprises a timer module connected to both the target base station determination module and the handover request transmission module; wherein, the handover request transmission module is further configured to: transmit a triggering message to the timer module;

the timer module is configured to: start and begin timing after receiving the triggering message;

the target base station determination module is further configured to: after receiving the handover request response message in a timing period of the timer module, when determining that the load state parameter is smaller than or equal to the load state threshold set by the system, determine an alternate target base station transmitting the handover request response message as the target base station, and indicate the terminal to perform handover to the target base station according to the wireless resource configuration information.

The above method can be further characterized in that:

the base station further comprises a timer module connected to both the target base station determination module and the handover request transmission module; wherein, the handover request transmission module is further configured to: transmit triggering message to the timer module;

the timer module is configured to: start and begin timing after receiving the triggering message;

the target base station determination module is further configured to: after receiving the handover request response message in a timing period of the tinier module, when determining that the load state parameters are all larger than the load state threshold set by the system, determine an alternate target base station corresponding to a minimal load state parameter in various load state parameters as the target base station, and indicate the terminal to perform handover to the target base station according to the wireless resource configuration information required in the terminal handover obtained from the target base station.

The method of the present invention avoids the re-request process of the base station when the handover request fails, which can improve the handover success ratio and reduce the handover interruption delay, and improve the key performance indicators during the handover process.

PREFERRED EMBODIMENTS OF THE PRESENT INVENTION

Figure 1:
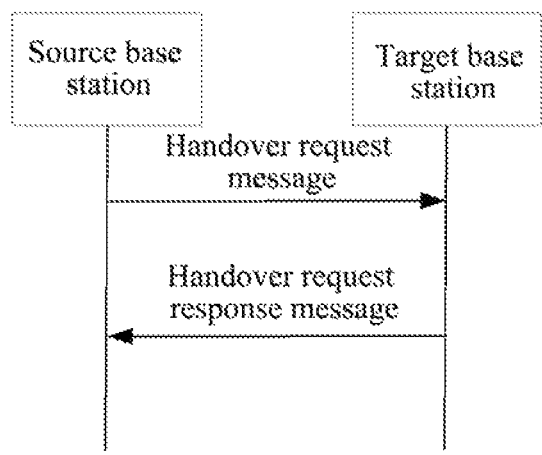
FIG. 1 is a schematic diagram of a handover method of a terminal based on an X2 interface of a base station in the related art.
Figure 2:
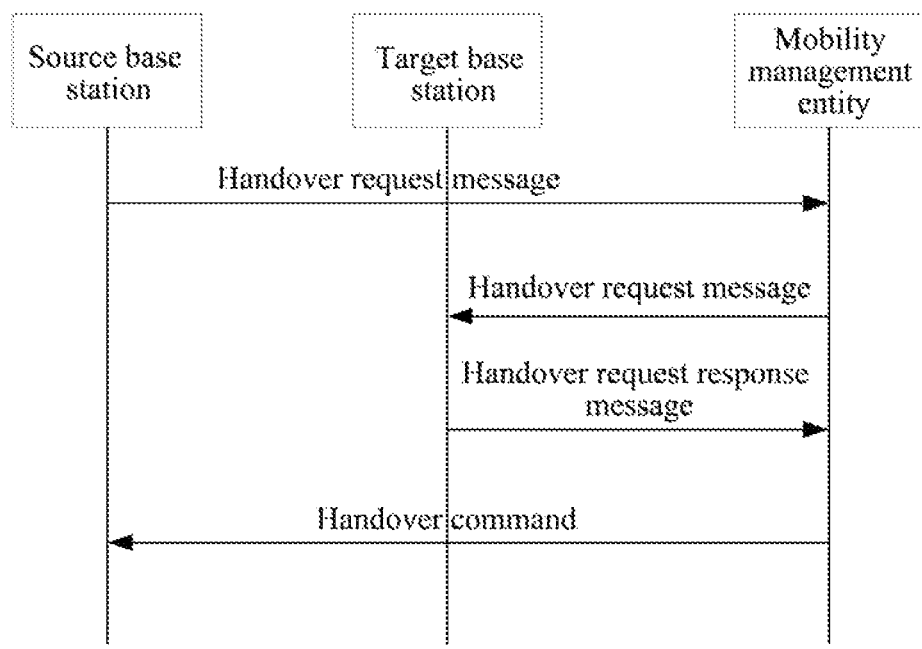
FIG. 2 is a schematic diagram of a handover method of a terminal based on an S1 interface of a base station in the related art.
Figure 3:
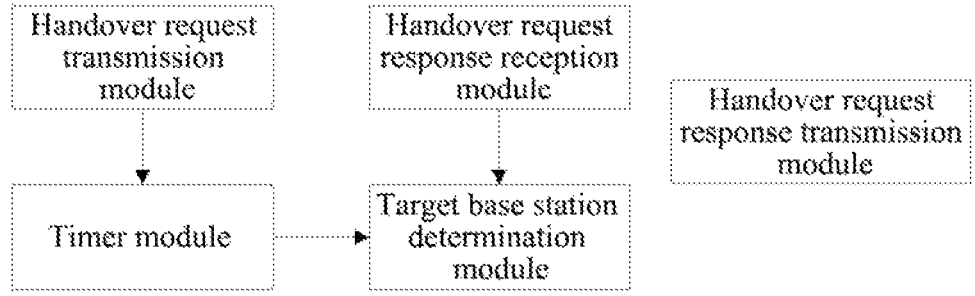
FIG. 3 is a structure diagram of a base station according to an embodiment.

As shown in FIG. 3, the base station of the present embodiment comprises a handover request transmission module, a timer module, a handover request response reception module, and a target base station determination module; and further comprises a handover request response transmission module; wherein, when the base station acts as a source base station to which a terminal belongs, the handover request transmission module is configured to: transmit a handover request message to at least one alternate target base station, and transmit a triggering message to the timer module;

the tinier module is configured to: start and begin timing after receiving the triggering message of the handover request transmission module;

when the base station acts as the source base station to which the terminal belongs, the handover request response reception module is configured to: receive a handover request response message returned by the alternate target base stations and analyze to obtain a load state parameter included in the handover request response message;

when the base station acts as the source base station to which the terminal belongs, the target base station determination module is configured to: when determining that the load state parameter included in the handover request response message is smaller than or equal to the load state threshold set by the system after receiving the handover request response message in the timing period of the timer module, determine the alternate target base station transmitting this handover request response message as the target base station; and when determining that the load state parameters included in various handover request response messages are all larger than the load state threshold set by the system after receiving the handover request response message in the timing period of the timer module, the source base station determines the alternate target base station corresponding to the minimal load state parameter in various load state parameters as the target base station.

When the base station acts as the alternate target base station of the terminal, the handover request response transmission module is further configured to: receive the handover request transmitted by the source base station, then calculate the load state parameter of this alternate target base station, when determining that the load state parameter is larger than a load state threshold set by a system, return a handover request response message including the load state parameter to the source base station directly or through a mobility management entity; and when determining that the load state parameter is smaller than or equal to the load state threshold set by the system, returning the handover request response message including the load state parameter and wireless resource configuration information required in the terminal handover to the source base station directly or through the mobility management entity. The load state parameter is one of following values: a value of a load quantity of the alternate target base station, a percentage value of the load quantity of the alternate target base station to a fixed load quantity set by the system, and a level of the load quantity of the alternate target base station.

Embodiment 1

Embodiment 1 is a case of the handover based on the X2 interface of the base station.

Figure 4:
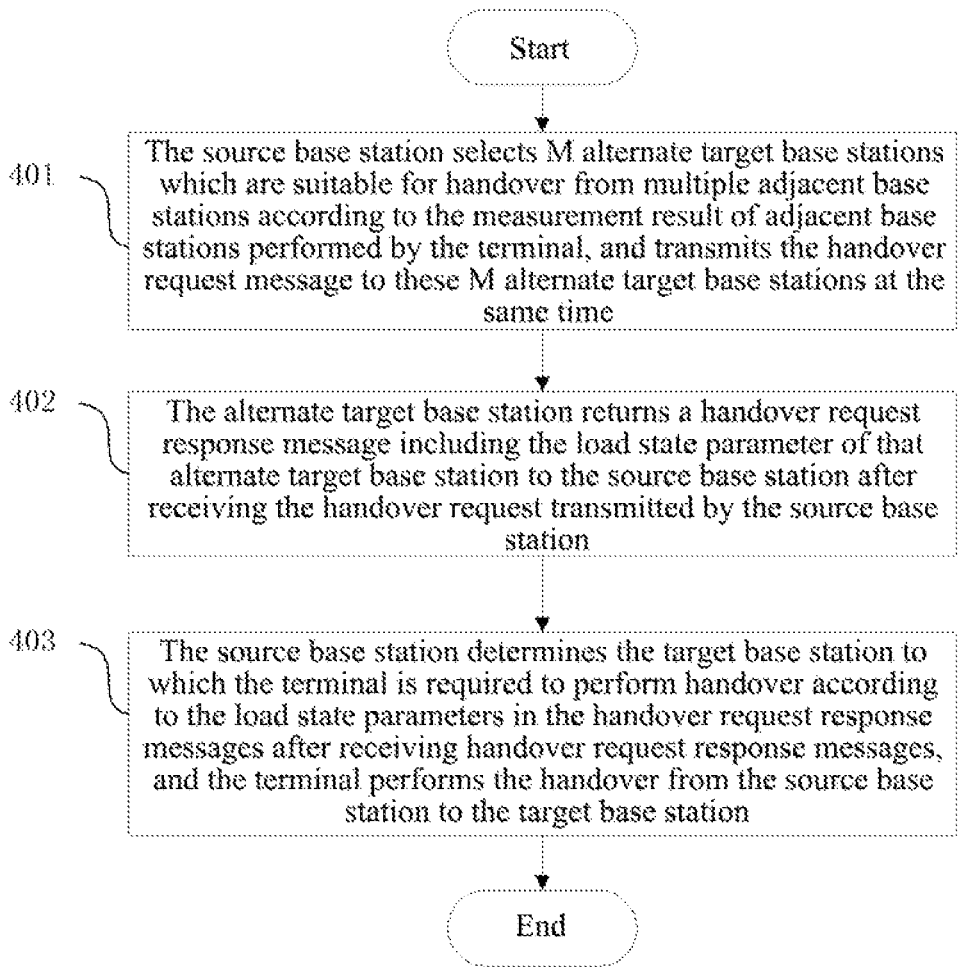
FIG. 4 is a flow chart of a handover method of a terminal according to an embodiment.

As shown in FIG. 4, the handover method of the base station comprises the following steps.

Step 401, the source base station selects M alternate target base stations which are suitable for handover from multiple adjacent base stations according to a measurement result which is performed by the terminal to the adjacent base stations, and transmits the handover request message to those M alternate target base stations at the same time; and starts the timer module;

the general principle of selecting M alternate target base stations which are suitable for handover is that the source base station selects the first M base stations with the best signal quality (such as, the pilot signal) measured by the terminal from all the base stations which satisfy the handover condition as the alternate target base stations. M is a configurable parameter according to the system structure or the link state, and M is an integer larger than or equal to 1, for example, M is 3.

The handover request message transmitted by the source base station can be a handover request message defined in the 3GPP R8 standard, and includes source cell information and handover terminal information.

Step 402, the alternate target base station receives the handover request message transmitted by the source base station, and then returns a handover request response message including a load state parameter of this alternate target base station to the source base station.

The alternate target base station calculates the load state parameter of this alternate target base station according to an admission control algorithm and a load algorithm (mainly considering the use ratio of the physical resource block). That load state parameter is used for describing the load condition of the alternate target base station, and can have a plurality of representation ways. That load state parameter can be a value representing the load quantity of the base station, also can be a percentage value of the load quantity of the base station to a fixed load quantity, and also can be a relative value, such as a level of the load quantity of the alternate target base station. When the load state parameter is a level parameter, the load quantity of the base station is divided into N sections from small to large, corresponding to N levels, and N is an integer larger than or equal to 2. For example, taking that N is 4 as an example, the available levels indicated by the load include: level 1 (also called as the mild level), level 2 (also called as the moderate level), level 3 (also called as the severe level) and level 4 (also called as super severe level) according to the load quantity from the large to small.

When the alternate target base station determines that the calculated load state parameter of the alternate target base station is smaller or equal to a load state threshold set by the system, the handover request response message returned to the source base station also include wireless resource configuration information required in the terminal handover besides the load state parameter. When the alternate target base station determines that the calculated load state parameter of the alternate target base station is larger than the load state threshold set by the system, then the handover request response message returned to the source base station only includes the load state parameter, and at this point, the handover request response message is only used for confirming that the handover request message is received.

When the load state parameter is represented by a value of the load quantity of the base station, the load state threshold set by the system is also a specific value of one load quantity of the base station.

When the load state parameter is represented by a level, taking that N is 4 as an example, and when the load state threshold set by the system is a level threshold larger than level 2 and smaller than level 3 and the load state parameter is level 1 or level 2, the handover request response message returned to the source base station also includes the wireless resource configuration information required in the terminal handover besides the load state parameter; when the load state parameter is level 3 or level 4, then the returned handover request response message only includes the load state parameter.

Step 403, the source base station determines the target base station to which the terminal is required to perform handover according to the load state parameter in the handover request response message after receiving the handover request response message, and the terminal performs handover to this target base station from the source base station.

After receiving the handover request response message in the timing period of the timer module, when the source base station determines that the load state parameter included in the handover request response message is smaller than or equal to the load state threshold set by the system, the source base station determines the alternate target base station transmitting that handover request response message as the target base station; and directly transmits the handover command to the terminal to indicate the terminal to perform handover to the target base station according to the wireless resource configuration information required in the terminal handover included in that handover request response message.

The source base station still continues to receive the handover request response message transmitted by other alternate target base stations after determining the target base station, and when the load state parameter included in the handover request response message is larger than the load state threshold set by the system, the source base station transmits a handover failure message to the alternate target base station transmitting that handover request response message or does not perform any processing.

When the load state parameters included in the handover request response message received in the timing period of the tinier module by the source base station are all larger than the load state threshold set by the system, the source base station determines the alternate target base station corresponding to the minimal load state parameter in various load state parameter as the target base station, transmits the handover request response message acknowledgment to confirm that the wireless resource configuration information required in the terminal handover is obtained from the target base station, and indicates the terminal to perform handover to the target base station according to the wireless resource configuration information.

For example, when the load state parameter is represented by a value of the load quantity of the base station, and when the load quantity included in the handover request response message received in the timing period of the timer by the source base station is smaller than or equal to a load quantity threshold set by the system, the request command is transmitted to UE directly; when the load quantities included in the handover request response messages received in the timing period of the timer by the source base station are all larger than the load quantity threshold set by the system, the source base station transmits the handover request response acknowledgement to the alternate target base station with the minimal load quantity in the transmitted handover request response message.

For another example, when the load state parameter includes 4 levels (that is, the above levels 1 to 4), and when the load state parameter included in the handover request response message received in the timing period of the timer by the source base station is level 1 or level 2, the request command is transmitted to UE directly. If the load state parameters included in the handover request response message received in the timing period of the timer by the source base station are all level 3 or level 4, then the source base station transmits the handover request response acknowledgement to the alternate target base station who transmits the handover request response message with the load state parameter of level 3.

For the other example, when the load state parameter includes 3 levels (the levels corresponding to the load quantity from small to large are level 1, level 2 and level 3 in sequence), and when the load state parameter included in the handover request response message received in the timing period of the timer by the source base station is level 1, the request command is transmitted to UE directly. If the load state parameters included in the handover request response message received in the timing period of the timer by the source base station are all level 2 or level 3, then the source base station transmits the handover request response acknowledgement to the alternate target base station who transmits the handover request response message with the load state parameter of level 2.

In the above handover method, the source base station can just determine the target base station in the timing period of the timer module, which avoids the re-request process of the base station when the handover request fails and can improve the handover success ratio and reduce the handover interruption delay.

Embodiment 2

Embodiment 2 is a case of the handover based on the S1 interface of the base station. The difference of the handover method from the embodiment 1 is mainly in that: the process of the source base station transmitting the handover request message to the alternate target base stations is that the source base station transmits the handover request message to the MME, and the MME forwards the handover request message to the alternate target base stations; and the handover request response message returned by the alternate target base stations are also forwarded to the source base station by the MME.

The above description is only the embodiments of the present invention and is not intended to limit the present invention. For those skilled in the art, there may be a variety of modifications and variations made to the present invention. All of modifications, equivalent substitutions, and improvements, etc. without departing from the spirit and essence of the present invention should be embodied in the protection scope of the present invention.

INDUSTRIAL APPLICABILITY

The present invention provides a handover method of a terminal and a base station, which avoid the re-request process of the base station when the handover request fails, and can improve the handover success ratio and reduce the handover interrupt delay, and improve the key performance indicators during the handover process.

What is claimed is:

1. A handover method of a target base station, comprising:
a source base station to which a terminal belongs transmitting a handover request message to one or more alternate target base stations;
each of the one or more alternate target base station calculating an parameter of load, and
when the parameter of load is larger than a threshold set by a system, returning a handover request response message including the parameter of load to the source base station directly or to the source base station through a mobility management entity to notify the source base station;
when the parameter of load is smaller than or equal to the threshold set by the system, returning the handover request response message including the parameter of load and wireless resource configuration information required in terminal handover to the source base station directly or to the source base station through the mobility management entity to notify the source base station;
after transmitting the handover request message, the source base station starting a timer module,
after receiving the handover request response message in a timing period of the timer module, the step of determining the target base station comprising: when parameters of load of the alternate target base stations are all larger than the threshold set by the system, the source base station determining an alternate target base station corresponding to a minimal one of the parameters of load of the alternate target base stations as the target base station,
the indicating step comprising: the source base station obtaining the wireless resource configuration information required in the terminal handover from the target base station, and indicating the terminal to perform handover to the target base station according to the wireless resource configuration information;

each of the one or more alternate target base stations notifying the source base station of the parameter of load respectively;

the source base station determining a target base station according to the parameter of load of the one or more alternate target base stations and indicating the terminal to perform handover to the target base station;

wherein the parameter of load is one of following values: a value of a load quantity of an alternate target base station, a percentage value of the load quantity to a fixed load quantity of an alternate target base station set by the system, and a level of the load quantity of an alternate target base station; wherein the levels corresponding to the load quantity from small to large are level 1, level 2, level 3 and level 4 in sequence, and the threshold set by the system is a level threshold larger than level 2 and smaller than level 3.

2. The method according to claim 1, further comprising:

after transmitting the handover request message, the source base station starting a timer module, after receiving the handover request response message in a timing period of the timer module, the step of determining the target base station comprising: when determining that the parameter of load is smaller than or equal to the threshold set by the system, determining the alternate target base station transmitting the handover request response message as the target base station, the indicating step comprising: indicating the terminal to perform handover to the target base station according to the wireless resource configuration information.

3. A base station, comprising: a handover request transmission module, a handover request response reception module, a target base station determination module, a handover request response transmission module and a timer module connected to both of the target base station determination module and the handover request transmission module; wherein, when the base station acts as a source base station to which a terminal belongs, the handover request transmission module is configured to: transmit a handover request message to one or more alternate target base stations;

the handover request response reception module is configured to: receive a handover request response message returned by one or more alternate target base stations and analyze to obtain a parameter of load included in each handover request response message;

the target base station determination module is configured to: determine a target base station according to parameters of load of the one or more alternate target base stations analyzed by the handover request response reception module, and indicate the terminal to perform handover to the target base station;

when the base station acts as the alternate target base station of the terminal, the handover request response transmission module is configured to: receive a handover request message, and return a handover request response message including a parameter of load to the source base station;

the handover request response transmission module is further configured to: calculate the parameter of load of the alternate target base station after receiving the handover request message transmitted by the source base station, and when the parameter of load is larger than a threshold set by a system, return the handover request response message including the parameter of load to the source base station directly or to the source base station through a mobility management entity;

when the parameter of load is smaller than or equal to the threshold set by the system, return the handover request response message including the parameter of load and wireless resource configuration information required in terminal handover to the source base station directly or to the source base station through the mobility management entity;

the handover request transmission module is further configured to: transmit a triggering message to the timer module;

the timer module is configured to initiate timing after receiving the triggering message;

the target base station determination module is further configured to: after receiving the handover request response message in a timing period of the timer module, when determining that-parameters of load of alternate target base stations are all larger than the threshold set by the system, determine an alternate target base station corresponding to a minimal one of the parameters as a target base station, and indicate the terminal to perform handover to the target base station according to the wireless resource configuration information required in the terminal handover obtained from the target base station;

wherein the parameter of load is one of following values: a value of a load quantity of an alternate target base station, a percentage value of the load quantity to a fixed load quantity of an alternate target base station set by the system, and a level of the load quantity of an alternate target base station; wherein the levels corresponding to the load quantity from small to large are level 1, level 2, level 3 and level 4 in sequence, and the threshold set by the system is a level threshold larger than level 2 and smaller than level 3.

4. The base station according to claim 2, further comprising a timer module connected to both of the target base station determination module and the handover request transmission module; wherein, the handover request transmission module is further configured to: transmit a triggering message to the timer module;

the timer module is configured to: initiate timing after receiving the triggering message;

the target base station determination module is further configured to: after receiving the handover request response message in a timing period of the timer module, when determining the parameter of load of an alternate target base station is smaller than or equal to the threshold set by the system, determine the alternate target base station transmitting the handover request response message as a target base station, and indicate the terminal to perform handover to the target base station according to the wireless resource configuration information.

* * * * *